Nov. 22, 1966  G. P. McCORD  3,287,485
METHOD OF PROVIDING A FLUID TIGHT SEAL
BETWEEN TWO RIGID COMPONENTS
Original Filed March 21, 1963
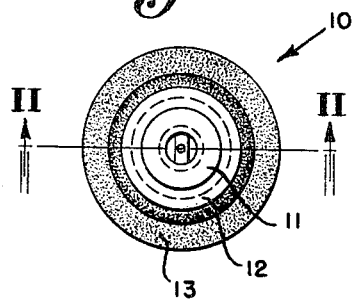
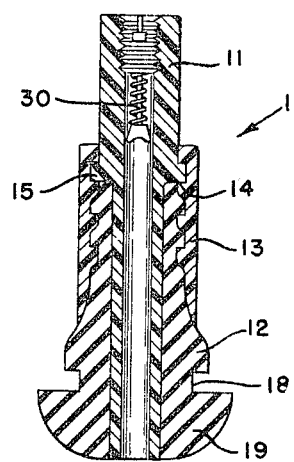
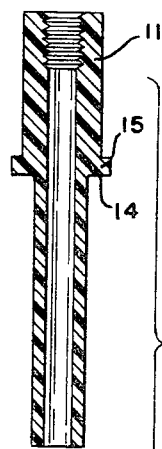
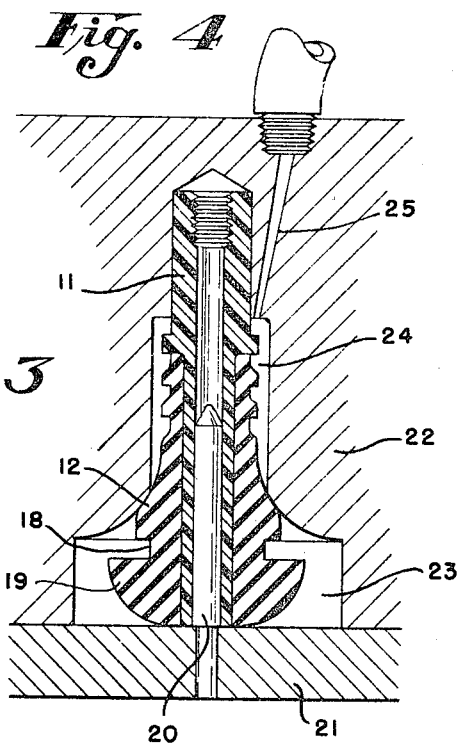
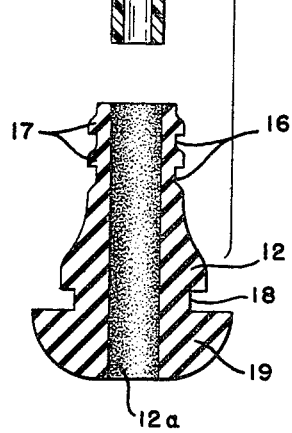
INVENTOR.
GEORGIE P. McCORD
BY Robert J. Patterson
ATTORNEY.

United States Patent Office 3,287,485
Patented Nov. 22, 1966

3,287,485
METHOD OF PROVIDING A FLUID TIGHT SEAL BETWEEN TWO RIGID COMPONENTS
Georgie P. McCord, Oaklandon, Ind., assignor to United States Rubber Company, New York, N.Y., a corporation of New Jersey
Original application Mar. 21, 1963, Ser. No. 266,922, now Patent No. 3,191,655, dated June 29, 1965. Divided and this application Sept. 19, 1963, Ser. No. 309,930
2 Claims. (Cl. 264—263)

This application is a division of my copending application Serial No. 266,922, filed March 21, 1963, now Patent No. 3,191,655.

This invention relates to an article of manufacture wherein a fluid-tight seal is provided between two rigid components through compression of an elastomeric component between the two rigid members, and to a method of making same. Potential applications of my invention are fluid-tight closures and valves. More particularly, my invention relates to a valve stem assembly for a tubeless tire and rim and to a method of making the same.

The principal object of my invention is to provide a novel method of making a new and improved article having a fluid-tight seal between two rigid members. Another object is to provide a method of fabricating an improved tubeless tire valve. Another object is to achieve the foregoing objects using conventional molding equipment and in particular, an injection molding process. Numerous other objects will appear hereinafter.

In one broad aspect, my invention is a method of making an article of manufacture comprising a first rigid component, a second rigid component, one of said rigid components being composed of solid plastic, one of said rigid components surrounding the other, and an elastomeric component disposed between the rigid components and being compressed tightly therebetween and forming a fluid-tight seal between the two rigid components.

In another broad aspect, my invention is a method of obtaining a fluid-tight seal between two rigid components which comprises inserting one of said rigid components (which can be composed of wood, metal, plastic, ceramic, artificial stone or any other suitable rigid material depending upon the end use of the finished article) and a cured elastomeric, but compressible, component in a mold cavity with one of the rigid components and the elastomeric component in contact with each other and with one surrounding the other and with an empty space constituting part of the mold cavity in annular contacting relationship with the elastomeric component, injecting plastic material, capable of setting to a rigid condition at room temperature, into the empty space until it has filled the same and has caused the elastomeric component to be tightly compressed against the first rigid component, and causing the plastic material so injected to set to form the second rigid component, after which the article is removed from the mold.

In practicing my invention, compression of the rubber component to form the fluid-tight seal is obtained by using the rubber component and one of the rigid components as inserts in a plastic injection mold and applying the other rigid component as a plastic component by injection molding.

The use of rigid inserts in injection molding of plastic articles is commonplace, but the use of elastic as opposed to rigid inserts is to the best of my knowledge novel and in particular the injection of a plastic to compress an elastic insert and thereby effect a fluid-tight seal between two rigid inserts is novel. The end use of the article employing my fluid-tight seal will dictate the choice of materials. Thus, the rubber part may have to be compounded for oil- or weather-resistance, non-toxicity or for any number of other qualifications. Any elastomer, which is deformable under compression but is resilient so that it will rapidly resume its original shape upon removal of the deforming force, is a prospective material. Examples of rubbers which can be used are: SBR, butyl, butadiene-acrylonitrile rubber (so-called Buna N or nitrile rubber), neoprene, natural rubber, cis-1,4-polybutadiene, synthetic cis-polyisoprene, ethylene-propylene rubber, ethylene-propylene-diene rubber, etc. The rigid component that is injection molded to complete the fluid-tight seal must of necessity be a plastic material. The first consideration is that it must be a material that will not yield (or flow) under the compression force exerted by the rubber component in the finished article and thereby fail to maintain a fluid-tight seal. In addition it is selected to have properties adapted to the environment in which it will be used.

I will now describe my invention with particular reference to the fabrication of a tubeless tire valve.

Tubeless tire valve stem assemblies have been fabricated from rubber and plastic components in an effort to achieve manufacturing economies. Such a valve stem assembly has been disclosed in my U.S. Patent No. 3,032,091. These valves achieve economies not only by utilizing inexpensive materials, but also by eliminating the costly machining necessary with the use of conventional metal parts.

In one specific application, the instant invention provides a tubeless tire valve assembly comprising a resilient rubber sealing member having an outside diameter greater than the diameter of the valve stem opening in the rim, the inner end of the rubber member being inserted in the opening so that the rubber is compressed into sealing engagement therewith. The inner end of the rubber member is defined herein as that end extending into the air chamber defined by the rim, the outer end being that which is exposed. The rubber member has an axially-extending cylindrical recess passing therethrough and is also provided with at least one protruding element on the exterior surface of its outer end.

A rigid tubular member, which may be of plastic, is disposed within this cylindrical recess, the tubular member itself being adapted to receive a valve core therein. The tubular member is also provided with a protruding element on its exterior surface adjacent the outer end of the rubber member. In use a valve core is disposed in the outer end of the tubular member.

Finally, a molded plastic sleeve surrounds both the rubber member and the tubular member, the interior surface of the sleeve conforming to the protruding elements on the exterior surfaces of the rubber member and the tubular member. Thus, the sleeve locks the two members together in fluid-tight realtionship.

Conveniently, the protruding element on the exterior surface of the rubber member may desirably comprise a circumferentially extending rib. Likewise, the protruding element on the exterior surface of the tubular member may desirably comprise a circumferentially extending projecting flange. This flange is adapted to seat itself on the outer end of the rubber member.

The invention also contemplates a method of making such a tire valve assembly. The method comprises assembling a resilient rubber sealing member having an outside diameter greater than the diameter of the opening in the tubeless tire rim, an axially extending cylindrical recess passing therethrough, and at least one protruding element on the exterior surface of the outer end, with a rigid plastic tubular member in the cylindrical recess. The tubular member is provided with a protruding element on its exterior surface adjacent the outer end of the rubber member and is also adapted to receive a valve core therein. The assembly is placed in a mold having a cavity portion surrounding both the rubber member and the tubular member, the cavity portion including the protruding elements on the exterior surfaces of the rubber member and the tubular member. Finally, plastic material is injected into the cavity portion of the mold under pressure, thereby to lock the rubber member and the tubular member together in fluid-tight relationship.

The invention will be further understood by referring to the following description, when read in conjunction with the accompanying drawings, wherein:

FIG. 1 is an enlarged plan view of the valve stem assembly of the instant invention;

FIG. 2 is a cross-sectional view taken on line 2—2 of FIG. 1;

FIG. 3 is an exploded cross-sectional view of the resilient rubber sealing member and the rigid plastic tubular member; and FIG. 4 is a cross-sectional view showing the rubber member and the tubular member assembled in a mold cavity preparatory to injecting plastic material into the cavity portion of the mold to lock the members together.

Referring to the drawings and in particular to FIGS. 1, 2 and 3, the valve of the instant invention, generally designated by reference 10, is comprised of a resilient rubber sealing member 12 assembled with a rigid plastic inner tubular member 11 and locked together by means of a molded plastic sleeve 13.

The resilient rubber sealing member 12 can be conveniently made by standard compression molding methods and is provided with an outside diameter greater than the diameter of the opening in the tubeless tire rim. Thus, a conventional rim engaging groove 18 and dome 19 constitute the rim sealing portion of valve 10. Rubber member 12 is molded with an axially extending cylindrical recess 12a therethrough and is also equipped with a series of alternate circumferential grooves 16 and ribs 17, to facilitate the locking of members 11 and 12 together. The type of rubber stock used in rubber member 12 is not limited by the particular valve design, but rather is dictated by the end use of the valve.

The plastic tubular member 11 shown in detail in FIG. 3 is conveniently made by standard injection molding methods. The choice of plastic is not particularly limited other than by the consideration of physical properties. Thermoplastics such as nylon or thermosetting plastics such as Bakelite (a phenol-formaldehyde resin) may be used. Tubular member 11 is provided with a seat 14 for engagement with rubber member 12. Member 11 is also provided with a circumferentially extending projecting flange 15, which acts as a locking means during final assembly. Tubular member 11 is disposed in cylindrical recess 12a of rubber member 12, as shown in FIG. 2.

Tubular member 11 is adapted to receive an air retaining element, such as the valve core 30 shown in FIG. 2. However, it should be understood that the type of valve core disclosed is not the only such air retaining element capable of being used in the assembly. Other types of valves, such as the one disclosed in the aforementioned Patent No. 3,032,091, may also be used.

As shown in FIG. 2, the rubber member 12 and tubular member 11 are locked together in fluid-tight relationship by a molded plastic sleeve 13. Sleeve 13 surrounds rubber member 12 and tubular member 11 as shown. The interior surface of sleeve 13 conforms to the protruding elements on the exterior surfaces of the other members.

The valve is made by assemblying members 11 and 12 so that tubular member 11 is received within cylindrical recess 12a of rubber member 12 until seat 14 comes into engagement with member 12. The assembly is then placed on a pin 20 on a mold plate 21. As shown in FIG. 4, an upper mold 22, having a preformed cavity 23, is then clamped in place and plastic material is injected into the cavity portion 24 through sprue 25, thus to form sleeve 13. The injection pressure, relative to the plastic material being injected, creates a compressive force on rubber member 12, thereby sealing members 11 and 12 in air-tight engagement.

*Example*

Rubber component 12 is made by the usual compression molding method commonly used in the industry, using either of the following formulations:

SBR compound: Parts by weight
  SBR (butadiene-styrene rubbery copolymer) __ 100
  ZnO (zinc oxide) _____ 5
  Lithopone _____ 20
  MPC (medium processing channel) Carbon
    Black _____ 50
  "Laurex" (zinc laurate) _____ 2
  Process oil _____ 10
  Benzothiazyl disulfide (accelerator) _____ 0.75
  Salicyclic acid (retarder) _____ 0.5
  Sulfur _____ 2.5
Butyl compound:
  Butyl 150 (a commercial type of butyl
    rubber) _____ 100
  ZnO _____ 85
  Medium channel type Carbon Black _____ 30
  Hydrocarbon oil _____ 10
  Tetramethyl thiuram disulfide (accelerator) __ 1
  Mercaptobenzothiazole (accelerator) _____ 1
  Sulfur _____ 4

The above compounds are mixed on conventional rubber mills and vulcanized under compression in a mold approximately 13 minutes at 350° F.

The rigid tubular insert 11 must be sufficiently inflexible or unyielding to resist deformation from forces resulting from the injection molding operation used to form the locking piece 13, and to then maintain compression on the rubber insert 12 in the finished part. Examples of materials which meet this requirement and are otherwise suitable are: metals, e.g., brass; thermosetting plastics such as polyester-styrene mixtures, phenol-formaldehyde resins, melamine-formaldehyde resins, urea-formaldehyde resins, etc.; thermoplastics such as nylon, polyethylene, polypropylene, cellulose acetate, methyl methacrylate polymer (so-called acrylic polymer), polystyrene, polyvinyl chloride, polyvinyl acetate, so-called graft polymers, blends of graft polymers with styrene-acrylonitrile resins, blends of Buna N with styrene-acrylonitrile resins, etc. Rubber is not applicable except as hard rubber or so-called "ebonite."

The locking piece 13 is generally made from a thermoplastic material capable of being injection molded. Thermosetting plastics have not generally been found to be adapted to be injection molded. Examples of suitable materials and their molding temperatures and pressures are as follows:

| Type | Commercial Example | Injection Molding Temperature (° F.) | Molding Pressure (p.s.i.) |
| --- | --- | --- | --- |
| Acetal | Delrin (duPont) | 400–440 | 10,000–20,000 |
| Acrylic (methyl methacrylate) | Lucite (duPont) | 325–500 | 10,000–20,000 |
| Cellulose Acetate | Celanese (Celanese Plastics) | 335–490 | 8,000–32,000 |
| Nylon Type 6/6 | Zytel 109 (duPont) | 470–720 | 10,000–25,000 |
| Polyethylene | Marlex (Phillips Chemical) | 300–600 | 10,000–20,000 |
| Polystyrene | Bakelite (Union Carbide) | 325–600 | 10,000–30,000 |

The selection of suitable materials for the two rigid inserts and for the elastomeric insert and of suitable methods of fabricating each of these three elements including the determination of mold design, of a method of locating members 11 and 12 in the mold, and of injection pressure and temperature for the injection molding step will be obvious to those skilled in the art from this description.

The instant invention results in reduced costs because of the substitution of plastic materials for metals. Also, the cost of injection molding of plastic is less than the cost of machining metal. Finally, the method of assembling the valve is cheaper than that of the conventional valve with a metal insert, inasmuch as no chemical preparation of the metal is required in order to insure a proper metal to rubber bond.

While a particular embodiment of the invention has been shown and described, it is to be understood that this is for the purpose of illustration only and that changes and modificatioins can be made therein without departing from the spirit and scope of the invention.

Having thus described my invention, what I claim and desire to protect by Letters Patent is:

1. The method of obtaining a fluid-tight seal between two rigid components, comprising
    positioning a first rigid component and a cured elastomeric component in a mold cavity in annular contacting relationship one with the other and with an empty space constituting part of said mold cavity in annular contacting relationship with said elastomeric component,
    injecting plastic material, capable of setting to a rigid condition at room temperature, into said empty space until it has filled same and has caused said elastomeric component to be tightly compressed against said first rigid component, and
    causing the plastic material so injected to set to form the second rigid component.

2. The method of making a tire valve for use in a tubeless tire rim having a valve stem opening therethrough, comprising
    assembling a resilient rubber sealing member having an outer diameter greater than the diameter of said opening in said rim,
        an axially extending cylindrical recess passing therethrough,
        and at least one protruding element on the exterior surface of its outer end,
    with a rigid tubular member in said cylindrical recess,
        said tubular member being provided with a protruding element on its exterior surface adjacent the outer end of said rubber member,
        said tubular member being adapted to receive a valve core therein;
    placing the assembly in a mold having a cavity portion surrounding said rubber member and said tubular member,
        said cavity portion including said protruding elements on the exterior surfaces of said rubber member and said tubular member;
    and injecting plastic material into said cavity portion under pressure, thereby to lock said rubber member and said tubular member together in fluid-tight relationship.

References Cited by the Examiner

UNITED STATES PATENTS

| | | | |
|---|---|---|---|
| 2,218,639 | 10/1940 | Crowley | 264—248 X |
| 2,275,081 | 3/1942 | Maynard | 264—248 X |
| 2,329,346 | 9/1943 | Goff | 264—248 X |
| 2,409,759 | 10/1946 | Hosking | 264—271 X |
| 2,939,906 | 6/1960 | Harwood | 264—263 X |
| 3,100,641 | 8/1963 | Nicholls et al. | 264—275 X |

ROBERT F. WHITE, *Primary Examiner.*

L. S. SQUIRES, *Assistant Examiner.*